United States Patent
Ellsworth (10) Patent No.: US 9,555,320 B2
(45) Date of Patent: Jan. 31, 2017

(54) SYSTEM AND METHOD TO IDENTIFY AND TRACK OBJECTS ON A SURFACE

(71) Applicant: CastAR, Inc., Kirkland, WA (US)

(72) Inventor: Jeri J. Ellsworth, Kirkland, WA (US)

(73) Assignee: CastAR, Inc., Palo Alto, CA (US)

(*) Notice: Subject to any disclaimer, the term of this patent is extended or adjusted under 35 U.S.C. 154(b) by 296 days.

(21) Appl. No.: 14/267,195

(22) Filed: May 1, 2014

(65) Prior Publication Data

US 2014/0340523 A1 Nov. 20, 2014

Related U.S. Application Data

(60) Provisional application No. 61/855,551, filed on May 17, 2013.

(51) Int. Cl.
*A63F 3/00* (2006.01)
*G01S 5/16* (2006.01)
*G06K 7/10* (2006.01)
*A63F 9/24* (2006.01)

(52) U.S. Cl.
CPC ............ *A63F 3/00643* (2013.01); *G01S 5/16* (2013.01); *G06K 7/10009* (2013.01); *G06K 7/10356* (2013.01); *A63F 2009/2435* (2013.01); *A63F 2009/2489* (2013.01)

(58) Field of Classification Search
CPC ................ A63F 2009/2489; A63F 2009/2435; A63F 3/00643; A63F 2003/00662; G01S 5/16; G06K 7/10009; G06K 7/10356
See application file for complete search history.

(56) References Cited

U.S. PATENT DOCUMENTS

| | | | | |
|---|---|---|---|---|
| 5,853,327 | A * | 12/1998 | Gilboa | A63F 3/00643 273/237 |
| 6,690,156 | B1 * | 2/2004 | Weiner | G01S 5/02 273/237 |
| 7,474,983 | B2 * | 1/2009 | Mazalek | G06F 3/011 702/150 |
| 7,791,483 | B2 | 9/2010 | Oberle | |
| 8,070,162 | B1 * | 12/2011 | Butcher | A63F 1/04 273/272 |
| 8,602,857 | B2 * | 12/2013 | Morichau-Beauchant | A63F 3/00214 273/236 |

(Continued)

FOREIGN PATENT DOCUMENTS

WO   WO 2015/113359 A1 * 8/2015   ............ G06F 3/033

OTHER PUBLICATIONS

Hinske et al.; "An RFID-based Infrastructure for Automatically Determining the Position and Orientation of Game Objects in Tabletop Games"; In: Carsten Magerkurth, Carsten Röcker (Eds.): Concepts and Technologies for Pervasive Games—A Reader for Pervasive Gaming Research. vol. 1, Shaker Verlag, pp. 311-336, Aachen, Germany, 2007.*

(Continued)

*Primary Examiner* — John Villecco (74) *Attorney, Agent, or Firm* — Beyer Law Group LLP (57) ABSTRACT

A system is provided by which objects with RFID tags can communicate with a surface containing exciting and sensing antennas so as to actuate optical emission from those objects. That light emission can then be used for fine position and orientation sensing by an array of cameras placed around the surface.

11 Claims, 6 Drawing Sheets

(56) References Cited

U.S. PATENT DOCUMENTS

| | | | |
|---|---|---|---|
| 9,028,315 B2 * | 5/2015 | Morichau-Beauchant | A63F 3/00214 273/237 |
| 9,435,628 B2 * | 9/2016 | Zachut | G01B 7/003 |
| 2002/0193047 A1 * | 12/2002 | Weston | A63H 3/00 446/484 |
| 2004/0248650 A1 * | 12/2004 | Colbert | A63F 3/00643 463/37 |
| 2006/0246403 A1 * | 11/2006 | Monpouet | A63F 3/00643 434/128 |
| 2008/0004110 A1 * | 1/2008 | Cortenraad | A63F 3/00643 463/34 |
| 2008/0058045 A1 * | 3/2008 | Cortenraad | A63F 3/00643 463/9 |
| 2008/0198138 A1 * | 8/2008 | McFarlane | G06F 3/0421 345/173 |
| 2008/0238885 A1 * | 10/2008 | Zachut | G06F 3/03545 345/174 |
| 2008/0280682 A1 * | 11/2008 | Brunner | G07F 17/32 463/40 |
| 2010/0032900 A1 * | 2/2010 | Wilm | A63F 3/00643 273/237 |
| 2010/0105477 A1 * | 4/2010 | Chang | A63F 9/24 463/36 |
| 2011/0195763 A1 * | 8/2011 | Kang | H04M 1/72544 463/6 |
| 2012/0007817 A1 * | 1/2012 | Heatherly | G06F 3/0416 345/173 |
| 2012/0032394 A1 * | 2/2012 | Levine | A63F 3/00157 273/238 |
| 2012/0056717 A1 * | 3/2012 | Maharbiz | A63F 3/00214 340/8.1 |
| 2012/0062490 A1 * | 3/2012 | Heatherly | A63F 13/02 345/173 |
| 2013/0123009 A1 * | 5/2013 | Maharbiz | A63F 3/00643 463/31 |
| 2013/0166408 A1 | 6/2013 | Edwards | |
| 2013/0233918 A1 | 9/2013 | Frerking | |
| 2014/0213357 A1 * | 7/2014 | Claffey | A63F 13/65 3/65 |
| 2015/0286294 A1 * | 10/2015 | Kopcke | G06F 3/039 345/163 |
| 2015/0290545 A1 * | 10/2015 | Barney | A63J 21/00 463/32 |
| 2016/0087693 A1 * | 3/2016 | Shimomura | A63F 13/34 340/10.1 |
| 2016/0175698 A1 * | 6/2016 | Shi | H02J 5/005 463/9 |

OTHER PUBLICATIONS

Hinske et al.; "Using a Movable RFID Antenna to Automatically Determine the Position and Orientation of Objects on a Tabletop"; Proceedings of EuroSSC 2008, Zurich, Switzerland. LNCS, vol. 5279, Springer, Berlin Heidelberg New York, Oct. 2008.*

Han et al.; "RFID-Based Digital Board Game Platforms"; Computing and Informatics; vol. 29, Apr. 2010, 11-41-1158.*

Sample et al; "Optical Localization of Passive UHF RFID Tags with Integrated LEDs"; Apr. 2012; 2012 IEEE International Conference on RFID (RFID); pp. 116-123.*

* cited by examiner

SYSTEM AND METHOD TO IDENTIFY AND TRACK OBJECTS ON A SURFACE

CLAIM OF PRIORITY

This application claims priority to U.S. Provisional Application No. 61/855,551 entitled "Method to identify and tracking object on a surface" filed May 17, 2013, which is incorporated herein by reference.
U.S. Patents
U.S. Pat. No. 7,791,483
U.S. Applications
2013/0,166,408
2013/0,233,918

BACKGROUND

Field of the Invention:
This invention relates to the field of virtual reality, augmented reality, board games and video games. More specifically this system allows a computer to track figurines, cards and other props placed on a sensor mat.

Description of the Related Art:
There are many examples of computer image based tracking system that use specially designed patterns and cameras to track objects placed on a surface. RFID based systems have also been also developed that allow figurines to be placed on a special surfaces, which trigger game play elements in video games.

SUMMARY

The invention comprises a mat that senses the contact of an RFID enabled object on one of a plurality of sensors. After the object is detected by RFID its location is further refined by an LED based tracking system. The RF link means of ID may also be further used to actuate the movable objects.

DETAILED DESCRIPTION

The low cost development of RFID tags makes possible the identification of game pieces and other objects when tags are attached to them and the pieces are located in proximity to RFID reading devices such as taught by Oberle U.S. Pat. No. 7,791,483. However, it is the case that fine position location of small pieces is difficult by means of the RF link characteristics. In order to overcome this difficulty, the current invention comprises light emitters associated with the RFID tags that can optically signal to one or more cameras, thus giving the ability to locate the object in fine position and determine its orientation.

Figure 1:
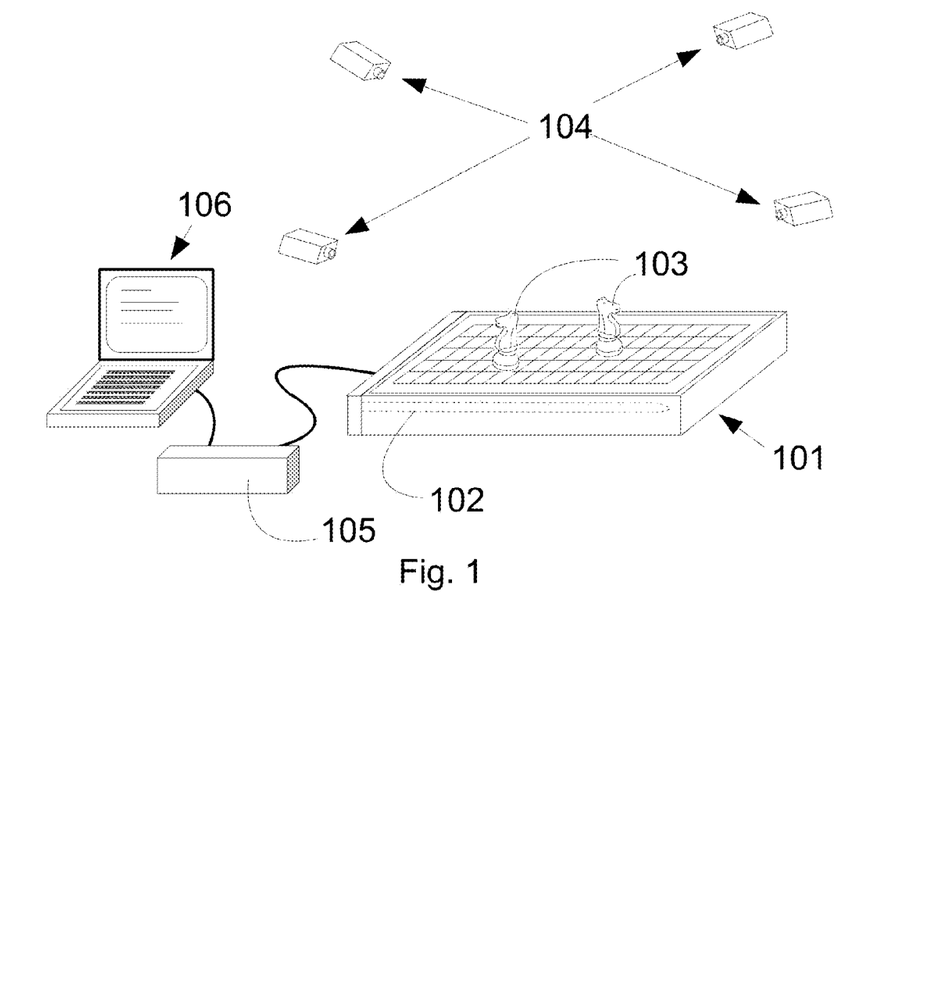
FIG. 1. Surface or mat with a plurality of RFID exciter/sense coils, multiple LED tracking cameras and movable game piece with RFID tag and LED.

A surface 101 such as would be used with board games or other ensembles of objects is shown in FIG. 1, which contains within it a pattern of overlapping RFID antenna loops 102. Also shown in FIG. 1 is an array of cameras 104 which are sensitive to the wavelength of light emitted by RFID tags (not shown directly in FIG. 1) attached to the movable objects 103 placed upon the surface. FIG. 1 also shows a circuit box 105 that houses the RFID excitation and sensing circuits as well as switching controls for dynamically selecting the loop antennas 102. The circuits in 105 are controlled by a computer 106 which also receives the images from camera array 104 by means of cables (not shown) or wireless communications.

Figure 2:
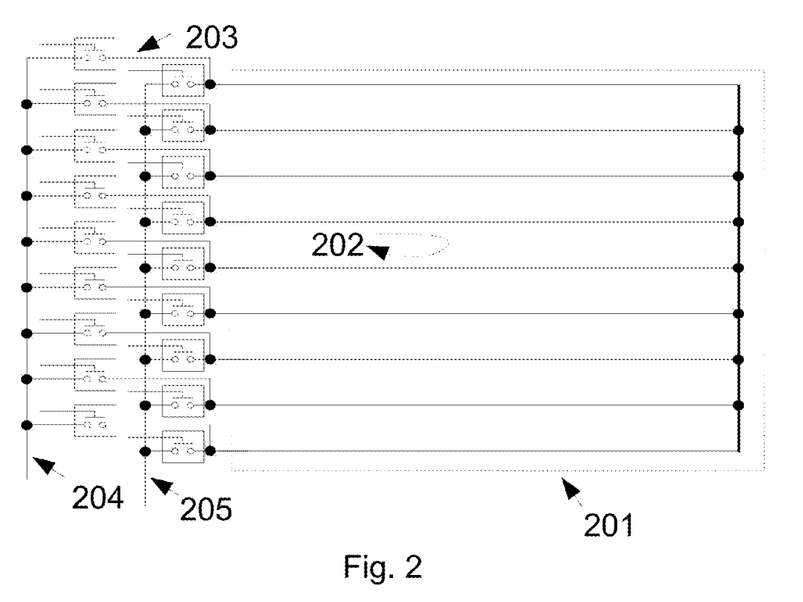
FIG. 2. Detail of tracking surface RFID exciter/sense coils.

FIG. 2 shows a detail view of one embodiment of the switching circuit of one plane 201 of loop RFID antennas. In this embodiment electronic switches 203 are provided to route the excitation radio frequency energy to a loop segment of the surface such as 202. The switches also allow the width of the loop to be adjusted by which signal line is chosen for the positive phase of the AC signal 204 and which signal line is chosen for the negative phase 205. Those skilled in the art will understand that computer 106 commands can be made to drive the control lines of the switches 203 (not shown) so as to scan the effective RFID excitation and sensing region in varible width strips over area 201.

Figure 3:
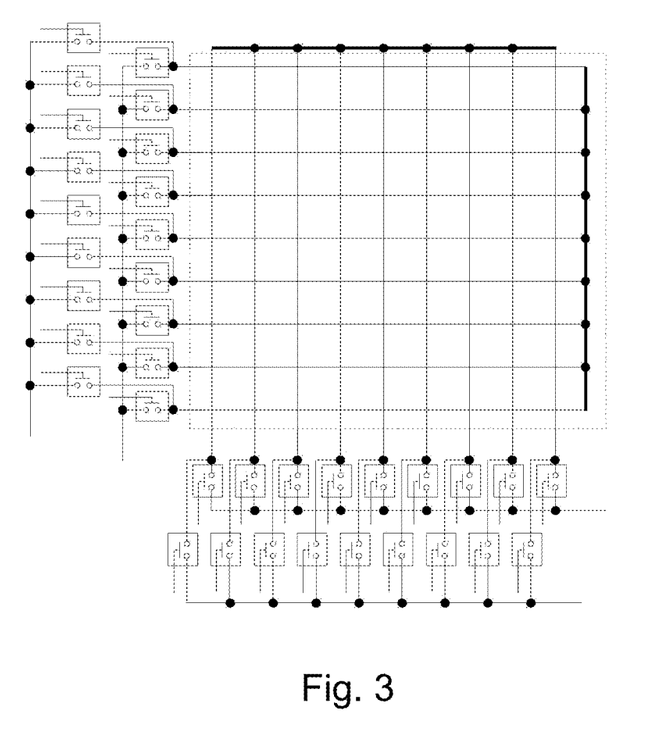
FIG. 3. X/Y placement of exciter/sense coils.

FIG. 3 shows an X/Y orthogonal placement of the antenna embodiment of FIG. 2 so that an object can be located in two dimensions on the surface. The two planes have an electrically insulating layer between them (not shown).

Figure 4:
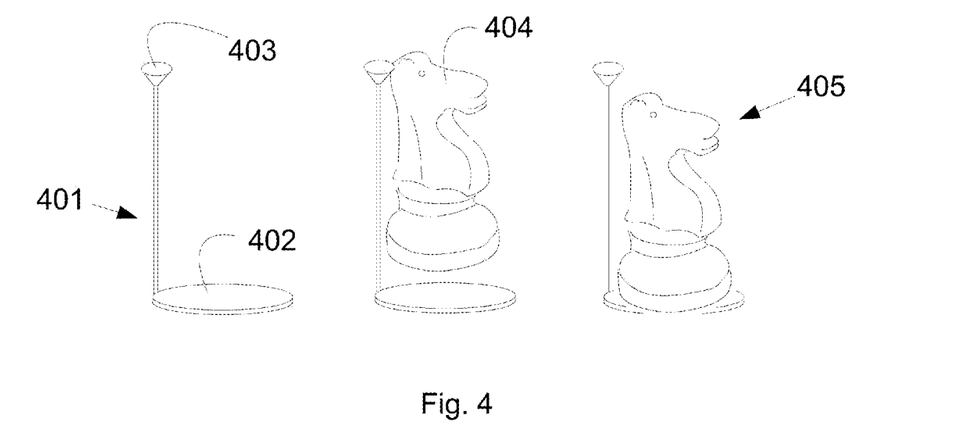
FIG. 4. Detail of LED placement upon game piece.

FIG. 4 gives a detail view of an embodiment of the light emitter assembly 401, with LED 403 associated with the RFID tag 402 placed under an object 404 to produce an assembly 405. The emitter may be made omnidirectional such that it will be received by all the cameras that are arrayed around the surface, or it may be configured to be directional such that only a subset of the camera array picks up the emitted light, thus allowing the system to determining the orientation of the object. Alternately, the object may contain orientation sensing means that provides an encoded digital output contained within the RFID return code, or appended to that code.

Figure 5:
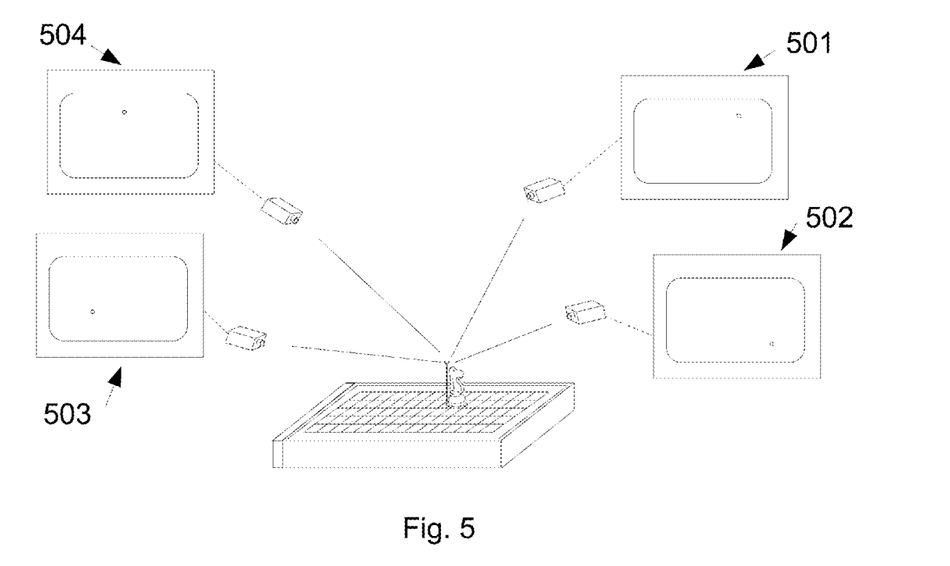
FIG. 5. Detail of LED tracking cameras.

An embodiment of the placement of cameras 104 is shown in FIG. 5, where screen shots are shown as 501 through 504 for a case in which the LED emits an infrared dot. The dot position in each image depends on the position and view of each camera. In some embodiments it is possible to gather all needed information from a single camera with a complete view of the surface, or with a single camera that has special optics that combine multiple views. The embodiment of FIG. 5 represents a typical case in which four cameras are placed at the corners of the surface, giving overlapping views that allow straight forward recovery of game piece position from the images returned.

The system operates by means of a computer or controller (not shown) that selectively activates the RFID exciter/sensor coil section so at to sweep the exciter/sensor electric field across the surface, first in one direction, and then in another direction orthogonal to the first (if position in both dimension is desired). Commercially available RFID tags have means to respond in ways to resolve collisions when more than one tag is excited, at the same time, along any given loop antenna section. Thus, the system may receive a plurality of ID replies for a given selection of loop. Those skilled in the art will known how to write software to drive the loop selections in search sequence and sort the returned ID codes so as to find the rough positions of the tagged objects placed upon the surface.

Once an object is known to the system and its rough position is determined, the exciter loop can be used to send messages to the RFID tag associated with that object. One such code is provided to actuate the light emitter mounted upon the object such that its fine position can be recovered from the images of that emitter returned by the camera or cameras. Another actuation code may be chosen to effect a change in the movable piece, such as flipping up, changing color, flashing, displaying messages, making noise, etc., as is well known in the art of animatronics.

It is also anticipated that the objects may have sensors that can transmit information as coded parts of the returned ID, or as codes appended to it. This may include without limitation, being touched, being lifted, being turned, magnetic field sense, gyroscopic deflection, temperature, pressure, the presence and intensity of vibration, the light level, still pictures or video, etc. In some embodiments, such data may also be returned to the computer system by modulation of the light emission from the objects, as received and decoded through the system of cameras or optical signal receivers.

Figure 6:
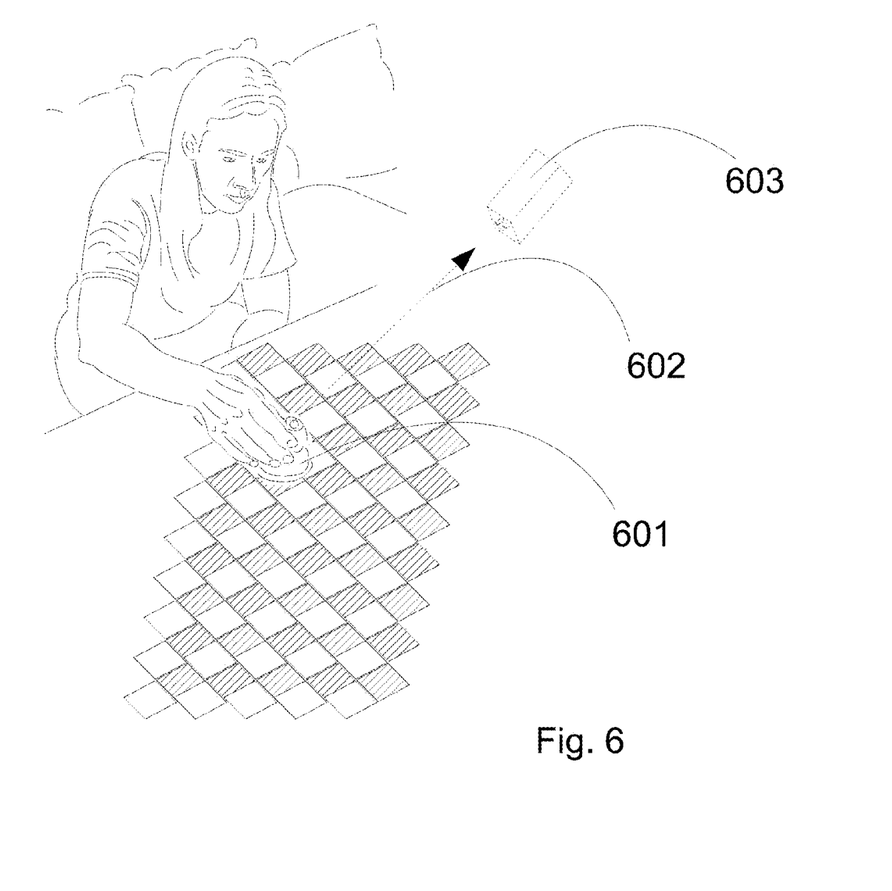
FIG. 6. Communication of touch sensor information to tracking camera.

An example of an embodiment is shown in FIG. 6, where game piece 601 is equipped with a touch sensor, such as by means of capacitance change, sends an encoded infrared signal 602 to tracking camera 603. The underlying RFID grid is not shown in FIG. 6, nor the possible plurality of tracking cameras or their mountings and interconnects.

CONCLUSION

An illustrative embodiment has been described by way of example herein. Those skilled in the art will understand, however, that change and modifications may be made to this embodiment without deputing from the true scope and spirit of the elements, products, and methods to which the embodiment is directed, which is defined by our claims.

I claim:

1. A system comprising:
a surface with one or more embedded loop antennas, said one or more embedded loop antennas connected to RFID electronic exciting and sensing circuitry;
one or more movable objects designed to be movably placed on said surface, said one or more objects having RFID tag circuitry compatible with said RFID exciting and sensing circuitry;
one or more optical emitters mounted in or on said objects, wherein said one or more emitters generate light under the control of command signals received by said one or more objects through said RFID tag circuitry;
one or more cameras, said one or more cameras arrayed around said surface to receive the light from said one or more optical emitters;
one or more control computers communicating with said exciting and sensing circuitry and said cameras, wherein said one or more control computers execute algorithms to derive the existence, identity, position and orientation of said one or more objects, with respect to said surface.

2. The system of claim 1, further comprising:
one or more actuation codes for, said one or more control computers to control said one or more objects through communications sent by said RFID exciting and sensing circuitry.

3. The system of claim 2, wherein said actuation code controls animatronic or display actions of said objects.

4. The system of claim 1, wherein switching circuitry under the control of said one or more control computers is arranged to change the effective region of excitation and sensing of said one or more embedded loop antennas.

5. The system of claim 1, wherein the one or more embedded loop antennas have antenna loops arrayed in overlapping planes, said planes oriented in orthogonal directions with regard to each other.

6. The system of claim 1, wherein one or more said objects have a sensor to sense environmental conditions and communicate information received through said sensor to said one or more control computers through said RFID tags and said excitation and sensing circuitry.

7. The system of claim 1, wherein one or more said objects have a sensor to sense environmental conditions and communicating information received through said sensors to said computers through modulation of said light emission.

8. A method comprising:
a. providing a surface containing RFID excitation and sensing circuitry;
b. providing objects with attached or embedded RFID tags compatible with said RFID excitation and sensing circuitry;
c. providing light emitting means in, or attached to said objects, wherein commands received by said RFID tags control a light emission;
d. providing one or more cameras, wherein said cameras are arrayed about said surface so as to receive said light emission;
e. providing one or more computers, wherein said computers control said excitation and sensing circuitry and wherein said computers receive images from said cameras;
f. switching through a pattern of activation of said RFID tags so as to roughly locate said objects on said surface by RFID reply from said RFID tags;
g. sending commands to said roughly located objects activating said light emission from said objects;
h. analyzing images of said light emission returned to said one or more computers from said one or more cameras to extract the fine position and orientation of said objects.

9. A method comprising:
a. providing a surface containing RFID excitation and sensing means;
b. providing objects with attached or embedded RFID tags compatible with said excitation and sensing means, wherein the embedded RFID tags have associated RFID antennas;
c. providing sensing means in, or attached to said objects, wherein commands received by said embedded RFID tags control said sensing means;
d. providing said objects with light emission means, wherein said light emission means transmits the data from said sensors as a modulated light emission;
e. providing one or more cameras or optical signal receivers, wherein said one or more cameras or optical signal receivers are arrayed about said surface so as to receive said modulated light emission;
f. providing one or more computers, wherein said one or more computers control said excitation and sensing circuitry;
g. communicating through activation of said RFID antennas so as to identify said objects on said surface by RFID reply from said RFID tags;
h. sending commands to said objects activating said sensing means provided in or on said objects;

i. receiving said sensor data at said one or more computers through analysis of images or demodulated light reception by said cameras or optical signal receivers.

10. An apparatus, comprising:
a surface containing RFID excitation and sensing circuitry;
an object including an attached or embedded RFID tag compatible with said RFID excitation and sensing circuitry;
a light emitter in, or attached to said object, with said light emitter controlled by commands received by said RFID tag to control a light emission;
at least one camera arrayed about said surface so as to receive said light emission;
at least one computer to control said RFID excitation and sensing circuitry and wherein said at least one computer receives images from said one or more cameras, said at least one computer configured to:
a. switch through a pattern of activation of said RFID tag so as to roughly locate said object on said surface by RFID reply;
b. send commands to said roughly located object activating said light emission from said object; and
c. analyze images of said light emission returned to said at least one from said one or more cameras to extract a fine position and orientation of said object.

11. An apparatus, comprising:
a surface containing RFID excitation and sensing circuitry;
an object with an attached or embedded RFID tag compatible with said excitation and sensing circuitry, wherein the embedded RFID tag has an associated RFID antenna;
a sensor in, or attached to said object, wherein commands received by said embedded RFID tag controls said sensor;
light emission means in said object, wherein said light emission means transmits the data from said sensor as a modulated light emission;
one or more cameras or optical signal receivers, wherein said one or more cameras or optical signal receivers are arrayed about said surface so as to receive said modulated light emission; and
one or more computers, wherein said one or more computers are configured to:
a. communicate through activation of said RFID antenna so as to identify said object on said surface by RFID reply from said RFID tag;
b. send commands to said object activating said sensor; and
c. receive said sensor data at said one or more computers through analysis of images or demodulated light reception by said cameras or optical signal receivers.

* * * * *